US00RE47089E

(19) United States
(12) Reissued Patent
Henson et al.

(10) Patent Number: US RE47,089 E
(45) Date of Reissued Patent: Oct. 16, 2018

(54) CABLE MANAGEMENT SYSTEMS FOR PRODUCT DISPLAY

(71) Applicant: Mobile Tech, Inc., Hillsboro, OR (US)

(72) Inventors: Donald Henson, Hillsboro, OR (US); Donald Niderost, Hillsboro, OR (US); James Larry Peacock, Hillsboro, OR (US)

(73) Assignee: MOBILE TECH, INC., Hillsboro, OR (US)

(21) Appl. No.: 14/216,706

(22) Filed: Mar. 17, 2014

Related U.S. Patent Documents

Reissue of:
(64) Patent No.: 7,909,641
Issued: Mar. 22, 2011
Appl. No.: 12/823,479
Filed: Jun. 25, 2010

U.S. Applications:
(63) Continuation of application No. 12/611,432, filed on Nov. 3, 2009, now Pat. No. 7,744,404.

(51) Int. Cl.
*H01R 13/72* (2006.01)
*H02G 11/00* (2006.01)
*H02G 3/04* (2006.01)

(52) U.S. Cl.
CPC ..... *H01R 13/72* (2013.01); *H02G 11/006* (2013.01); *H02G 3/0462* (2013.01)

(58) Field of Classification Search
CPC ..... A47F 7/024; B65H 75/446; E05B 45/005; G08B 13/1409; G08B 13/1445; F16C 1/22
USPC ..... 211/119.003; 248/542; 340/541, 548, 340/568.1, 568.2; 439/22; 74/501.5 R
See application file for complete search history.

(56) References Cited

U.S. PATENT DOCUMENTS

| | | | |
|---|---|---|---|
| 1,730,945 | A | 10/1929 | Alexander |
| 2,060,913 | A | 11/1936 | Weaver |
| 3,324,233 | A | 6/1967 | Herman |
| 3,813,481 | A | 5/1974 | Adams |
| 3,816,644 | A | 6/1974 | Giffel et al. |
| 4,357,500 | A | 11/1982 | Nilsen |
| 4,384,688 | A | 5/1983 | Smith |
| 4,590,337 | A | 5/1986 | Engelmore |
| 4,719,319 | A | 1/1988 | Tighe, Jr. |
| 4,746,766 | A | 5/1988 | Soulard |
| 4,964,414 | A | 10/1990 | Handa et al. |
| 5,016,646 | A | 5/1991 | Gotthardt et al. |
| 5,146,205 | A | 9/1992 | Keifer et al. |

(Continued)

OTHER PUBLICATIONS

"Reasons for Substantial New Question of Patentability", paper issued in Control No. 96/000,007, Jan. 30, 2013.

(Continued)

*Primary Examiner* — Christopher E. Lee
(74) *Attorney, Agent, or Firm* — Thompson Coburn LLP

(57) ABSTRACT

A cable retraction mechanism for displaying merchandise mounted on a display post in a retail location. The cable retraction mechanism includes a cable assembly having a coiled or equivalent elastically stretchable section. The mechanism also includes a coaxial housing that is connected to a portion of the cable assembly. The reciprocating motion or action of the shuttle within the housing facilitates extension and retraction of the cable assembly in a manner that is independent of the coiled section.

16 Claims, 11 Drawing Sheets

(56) References Cited

U.S. PATENT DOCUMENTS

| | | | | |
|---|---|---|---|---|
| 5,279,135 | A | 1/1994 | Leyden et al. | |
| 5,315,063 | A | 5/1994 | Auclair | |
| 5,763,836 | A | 6/1998 | Anastasi et al. | |
| 5,834,699 | A | 11/1998 | Buck et al. | |
| 5,884,403 | A | 3/1999 | Rogers | |
| 6,170,775 | B1 | 1/2001 | Kovacik et al. | |
| 6,386,906 | B1 | 5/2002 | Burke | |
| 6,396,414 | B1 | 5/2002 | Bickford et al. | |
| 6,748,707 | B1 | 6/2004 | Buchalter et al. | |
| 6,831,560 | B2 * | 12/2004 | Gresset | A47F 7/024 340/568.2 |
| 6,896,543 | B2 * | 5/2005 | Fort | G08B 13/1445 340/568.1 |
| 6,946,961 | B2 * | 9/2005 | Frederiksen | G08B 13/1445 340/548 |
| 7,053,774 | B2 | 5/2006 | Sedon et al. | |
| 7,101,187 | B1 * | 9/2006 | Deconinck | H01R 24/64 439/22 |
| 7,202,417 | B2 | 4/2007 | Marszalek et al. | |
| 7,209,038 | B1 * | 4/2007 | Deconinck | G08B 13/1409 340/541 |
| 7,385,522 | B2 | 6/2008 | Belden, Jr. et al. | |
| 7,446,659 | B2 | 11/2008 | Marsilio et al. | |
| 7,522,047 | B2 | 4/2009 | Belden, Jr. et al. | |
| 7,626,500 | B2 * | 12/2009 | Belden, Jr. | E05B 45/005 340/568.1 |
| 7,724,135 | B2 * | 5/2010 | Rapp | A47F 7/024 211/119.003 |
| 7,744,404 | B1 * | 6/2010 | Henson et al. | 439/501 |
| 7,861,501 | B2 | 1/2011 | Poulin | |
| 8,674,833 | B2 | 3/2014 | Johnston et al. | |
| 2006/0011378 | A1 | 1/2006 | Maeda | |
| 2006/0053939 | A1 * | 3/2006 | Basile | F16C 1/22 74/501.5 R |
| 2006/0131062 | A1 | 6/2006 | Bertges et al. | |
| 2008/0142665 | A1 | 6/2008 | Belden et al. | |
| 2008/0168806 | A1 | 7/2008 | Belden et al. | |
| 2008/0169923 | A1 | 7/2008 | Belden et al. | |
| 2009/0033492 | A1 | 2/2009 | Rapp et al. | |
| 2009/0173868 | A1 | 7/2009 | Fawcett et al. | |
| 2009/0211784 | A1 | 8/2009 | Grogl et al. | |
| 2011/0303816 | A1 * | 12/2011 | Horvath | B65H 75/446 248/542 |
| 2011/0309928 | A1 | 12/2011 | Henson et al. | |
| 2011/0309934 | A1 | 12/2011 | Henson et al. | |
| 2012/0120571 | A1 | 5/2012 | Bisesti et al. | |
| 2012/0188082 | A1 | 7/2012 | Berglund et al. | |
| 2012/0299755 | A1 | 11/2012 | Jones | |

OTHER PUBLICATIONS

Mike Cook, "Declaration of Mike Cook," pleading filed in Case No. 3:10-cv-392-BR, U.S. District Court (Oregon), Oct. 19, 2010.

MTI, "Freedom Universal 2.0 Product Manual," (manual), Dec. 2008.

Office Action, issued in Horvath (U.S. Appl. No. 12/802,644), dated Nov. 30, 2012.

Protex International Corp., "Instructions for PowerPro Detangler," (instruction sheet, 2005, Bohemia, New York.

Protex International Corp., "Instructions for PowerPro Sensor Head," (instruction sheet), 2007, Bohemia, New York.

MTI 2008 PowerPoint.

Protex International Corp., "PowerPro System," (instruction sheet) 2006, Bohemia, New York.

Reuters, "MTI Beings Shipping Freedom(TM) Universal 2.0 Merchandising Solution," (article), Oct. 1, 2008.

Thaine H. Allison, III, "Declaration of Thaine Allison in Support of Patent Owner's Reply to Petitioner's Opposition to Patent Owner's Motion to Amend," pleading filed in PTAB Case IPR2013-00122, Feb. 5, 2014.

Huseby, Inc. "Transcript of Deposition of Thaine H. Allison, III," Feb. 24, 2014, Charlotte, NC.

"35 mm Camera Display"—Walmart Publication 1995.

* cited by examiner

CABLE MANAGEMENT SYSTEMS FOR PRODUCT DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to retail displays for electronic devices. More specifically, the invention relates to display posts that enable the "swapping" of electronic devices to and from an individual display post position.

BACKGROUND

"Big box" retailers and cell phone companies offer a wide variety of hand-held electronic devices (cell phones, PDAs, digital cameras, digital camcorders, etc.) for sale to the general public. It is common practice to tether these devices to a display counter or similar surface in a retail store. Sometimes the tether is nothing more than a coiled cord (commonly called a "curly-Q cord") similar to the type of coiled cord used to connect a telephone handset to the base of the telephone. It is also common to extend the tether from a reel underneath the countertop surface with the tether extending and retracting as the consumer respectively lifts and replaces a product.

Many design variations have been developed over the years for tethering electronic products to displays. These displays address common problems that include managing the tether's length, so that it does not tangle, and devising ways to facilitate swapping old products with new models off the end of the tether.

The tether is often a shielded, multi-conductor cable having one or more wires for providing power and security alarm functions. One of the problems that retail display systems need to address is that product power requirements and power jack fittings are ever-changing because of technology improvements and consumer demand.

For those systems having tethers that extend and retract, it is important that the tether retracts fully back into the countertop as the product is returned to its resting place (typically, a base mount). Different designs have been developed for accomplishing the retraction that is needed, including under-the-counter reels. In some cases, curly-Q cords have been used.

One problem with a curly-Q cord system is that the coil diameter of these cords creates a larger footprint, making it difficult for the cord to fully retract through an opening. If the opening is about the same size as the coil diameter, for example, then there is a tendency for individual coils to catch on the opening's edge. The invention described here is an improvement on the "curly-Q" type of design.

Another general problem with tethered systems relates to how the tether responds to use by consumers in the store. Frequent handling causes tangling and distortions in the cord that impact both cord wear and its ability to fully retract. The invention described here also addresses this problem.

SUMMARY OF THE INVENTION

The invention disclosed here is a cable management system for displaying one out of a plurality of electronic devices in a commercial setting. As a person familiar with the technology would understand, the cable management system described here is intended to be replicated as part of a multi-post display system, involving many numbers of positions corresponding to different kinds of electronic devices that are sold by retailers.

The cable management system includes a first cable assembly having an elastically stretchable length. The terminology "elastically stretchable length" is meant to include cords like the common curly-Q cord system or any other type of cord having the capability of elastically stretching in some fashion. All of the equivalent variations are considered to be within the scope of "elastically stretchable length" or similar designations.

The cable management system disclosed here also includes a housing for the first cable assembly. The housing includes inner and outer coaxial tubular parts.

The housing's inner tubular part defines a hollow space that both retains the first cable assembly and provides a guide for a shuttle member ("shuttle"). Two slits along the length of the inner tubular part both guide the shuttle and prevent it from rotating inside the inner tubular part.

The outer tubular part surrounds, covers, and caps one end of the inner tubular part. The respective inner and outer diameters of the two tubular parts are not equal such that a cylindrical space is created between them. A spring is received in this space and biased to resist or oppose inward sliding movement of the shuttle by riding against a portion of the shuttle that extends through the slits into the cylindrical space.

The first cable assembly extends through the inner tubular part and connects to the shuttle. When the cable assembly is pulled in tension, it likewise pulls the shuttle inwardly—further into the housing's inner tubular part. When this happens, the elastically stretchable portion of the first cable assembly (e.g., the coiled portion of the curly-Q cord, if used) travels with the shuttle until the shuttle reaches the end its path of travel. The first cable assembly extends, or stretches to the maximum pull length allowed by its coils (or an equivalent stretchable length portion). At the same time, the shuttle is pulled against the bias of the spring in the housing. This creates two independent sources of return tension for pulling the cable assembly back into the housing when it is released.

A mounting member is connected to the outer end of the first cable assembly. The mounting member provides a means to mount an electronic device above a countertop surface. Lifting the mounting member pulls the first cable assembly out from the housing (and typically, through an opening in the countertop surface). As the mounting member is returned to its original position, the spring returns the shuttle to its normal, at rest, position and the stretched part of the cable assembly also returns to normal.

As an alternative design, the spring may be attached directly to the first cable assembly without necessarily being enclosed in a housing made from coaxial tubular parts. While the spring may not be fully enclosed in the same way as the hollow tube example, the spring still augments the retraction force naturally occurring in stretched coil cords, for example, to more reliably return the product to its resting place.

As still another alternative, an in-line swivel can be added to alleviate tangling and distortions caused by cord twisting. The in-line swivel permits one part or portion of the first cable assembly to rotate relative to the other, during the pulling and retraction process, while maintaining electrical continuity through the wires in the cable assembly.

Similar to other designs, a second cable assembly may be used to electrically couple the electronic device to the first cable assembly. The second cable assembly is electrically coupled via conventional connectors or board connections that allow power or security signals to pass through the mounting member. There are also alternative ways of accomplishing the coupling function without using the mounting member as a connecting means.

If used, the second cable assembly couples the first cable assembly to the electronic device, as necessary, in order to accomplish one or more power and security functions. One common function is to provide power to the device. It is also common to use second cable assemblies to provide a security function, i.e., providing power to a security sensor attached to a camera or cell phone.

The terminology "electrically coupling" is intended to capture all of the variations described above and equivalent variations. In some cases, more than one "secondary" cable assembly will be connected to the first one. In other words, one type of secondary cable assembly might be used to provide power; another might be used to provide security, etc. A person skilled in the art will have knowledge of the different kinds of secondary cable installations.

As described above, the purpose of the in-line swivel is to minimize torsional strains on the cable assembly as it is stretched and twisted by the consumer. Over a period of many years, the in-line swivel improves wear and durability of the cable assembly during the course of many cable extensions and retractions.

The in-line swivel may be placed in different locations. In one embodiment, the swivel is received in the mounting member, essentially at the interface between the first cable assembly and other electronics in the mounting member. In another embodiment, the swivel assembly is received within the shuttle and rides within the inner tubular part of the housing. It is also conceivable and, perhaps, it is preferable to use in-line swivels at both places at the same time. However, the number and placement of in-line swivel assemblies will depend on the merchandising application. Finally, an in-line swivel in combination with a curly-Q cord may be sufficient to enable full cord retraction without spring augmentation.

The invention summarized above is described in greater detail below in combination with the accompanying drawings.

BRIEF DESCRIPTION OF THE DRAWINGS

In the drawings, like reference numerals and numbers refer to like parts throughout the various views, and wherein.

DETAILED DESCRIPTION

Figure 1:
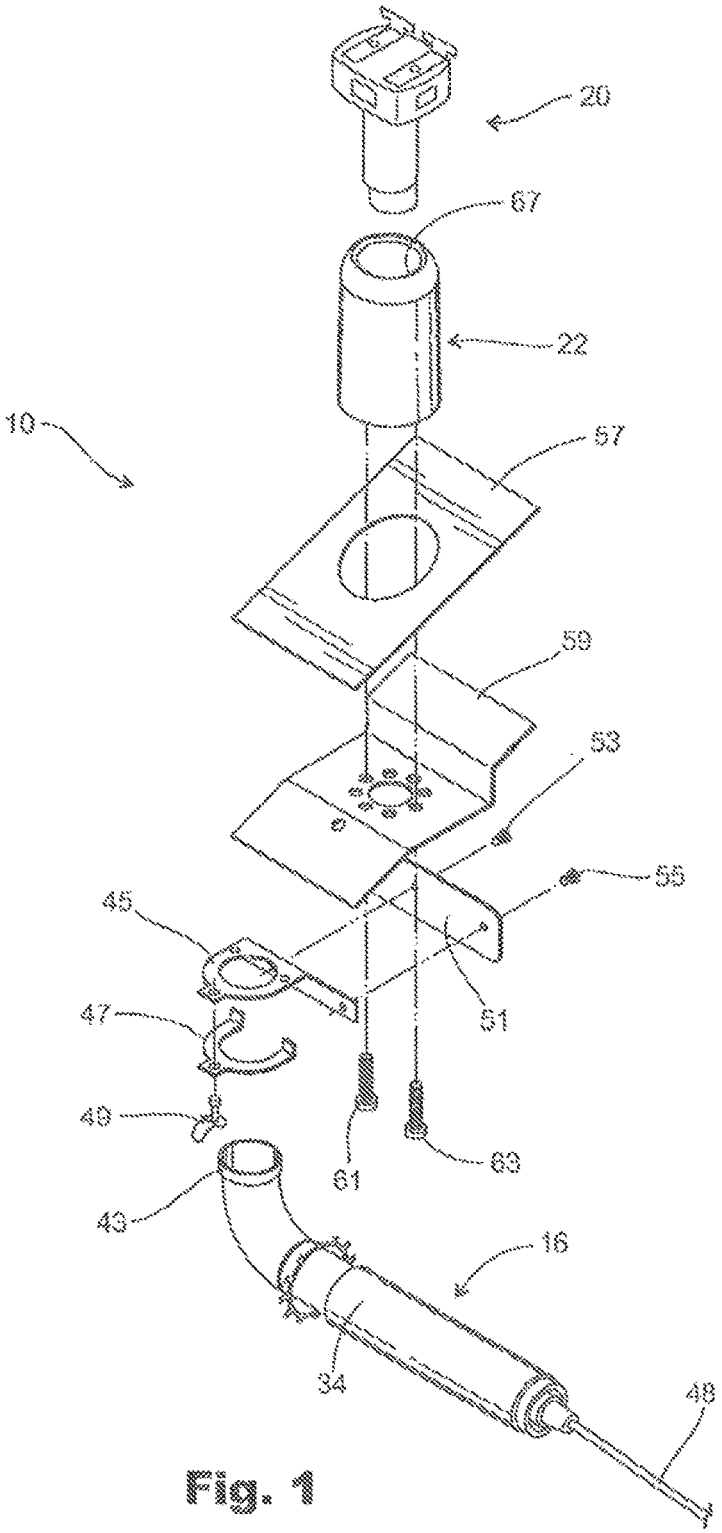
FIG. 1 is an exploded pictorial view of a display post design constructed in accordance with the invention.
Figure 2:
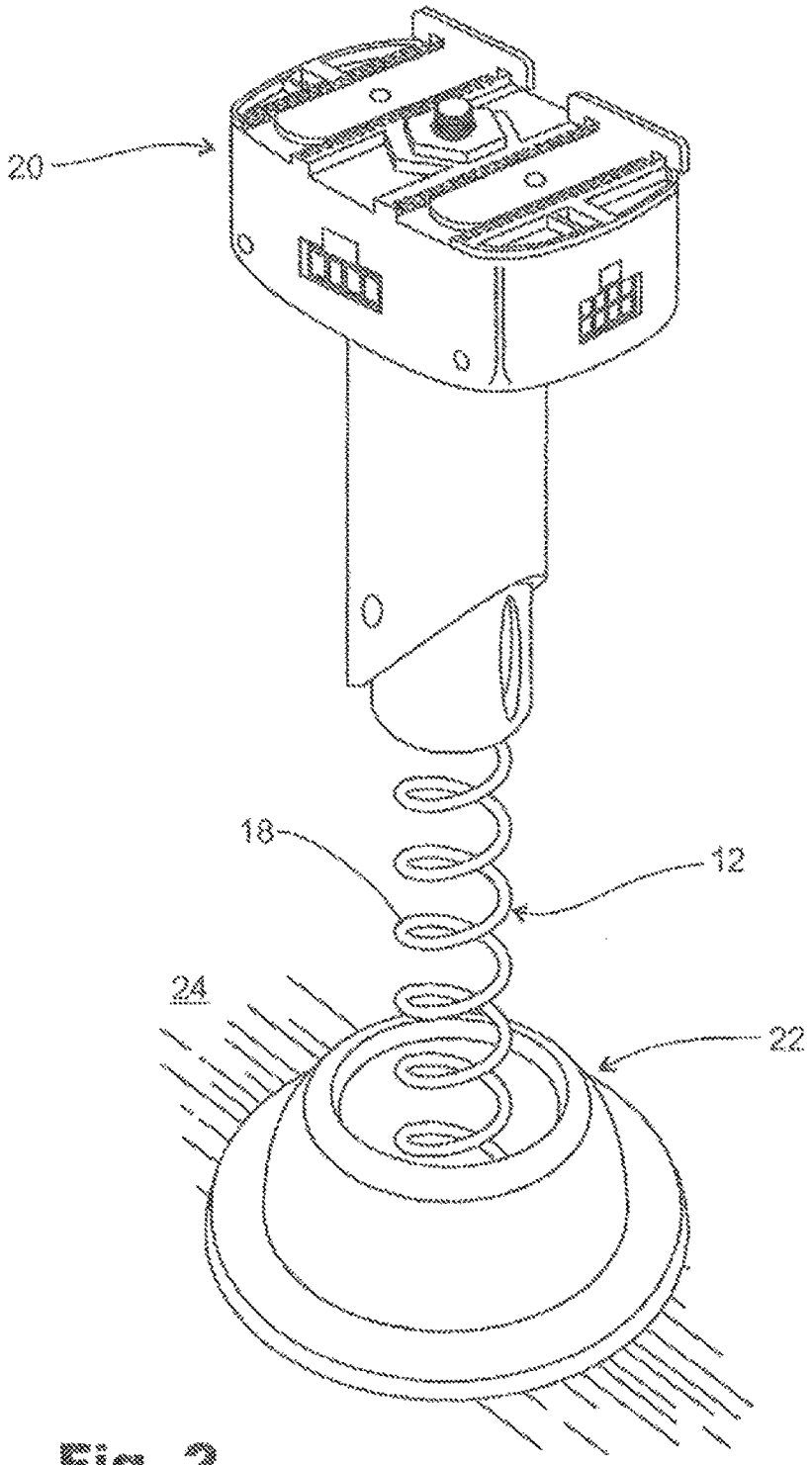
FIG. 2 is a pictorial view of the upper part of the design illustrated in FIG. 1.
Figure 10:
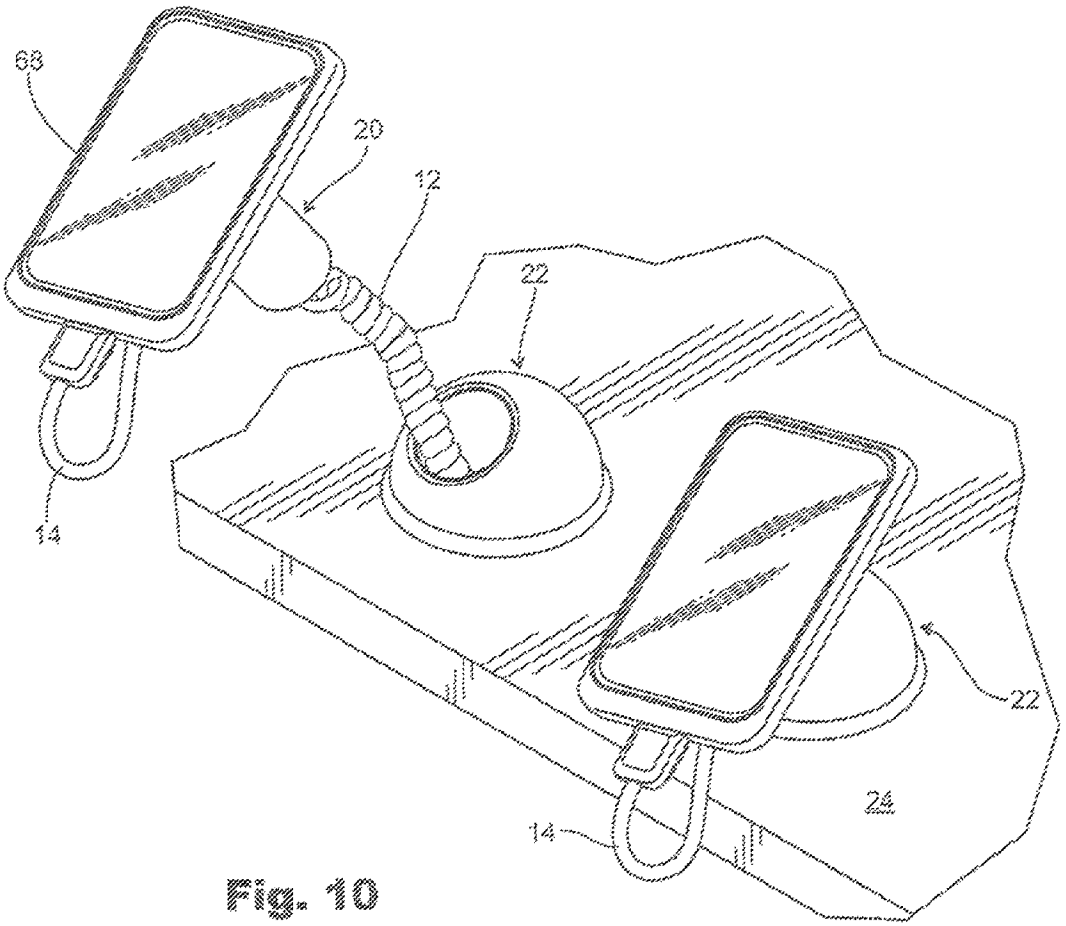
FIG. 10 is a pictorial view of the upper part of the design illustrated in FIG. 1, but shows the mounting member being lifted from a countertop surface with a PDA (or cell phone) mounted to the upper surface of the mounting member, and a second cable assembly electrically coupling the electronic device to the mounting member.

Referring now to the drawings, and first to FIG. 10, shown generally at 10 is a cable management system constructed in accordance with a preferred embodiment of the invention. FIG. 1 does not depict the cable assemblies. However, the cable management system 10 includes first and second cable assemblies 12, 14, that are respectively illustrated in FIGS. 2-5 and FIG. 10.

For background purposes, reference is made to U.S. Patent Application Publication US2008-0169923, published Jul. 17, 2008, to InVue Security Products, Inc. of Charlotte, N.C. ("the '923 publication".). The security system disclosed in the '923 publication is typical of many kinds of designs presently in the marketplace and shows a secondary cable assembly 89 interconnecting an electronic device 7 to a mounting piece 5. The secondary cable 89 is electrically coupled to another (or "first") cable assembly 59 underneath a countertop. The use of first and second cable assemblies in this manner is common to the retail security and display industry.

It is to be understood the designs disclosed in the '923 publication are incorporated here by reference. It is to be appreciated, for example, that the power cord 77 disclosed in the '923 publication is a type of curly-Q cord, although it is a different design from the one disclosed here. As a person familiar with the technology would understand, there are different ways to electrically couple these two cable assemblies together. Connections of this type would be familiar to the skilled person.

Directing attention now to FIG. 1, the first cable assembly 12 is housed within a coaxial housing, indicated generally at 16. The coaxial housing 16 is better illustrated in FIGS. 3, 4 and 5.

Figure 5:
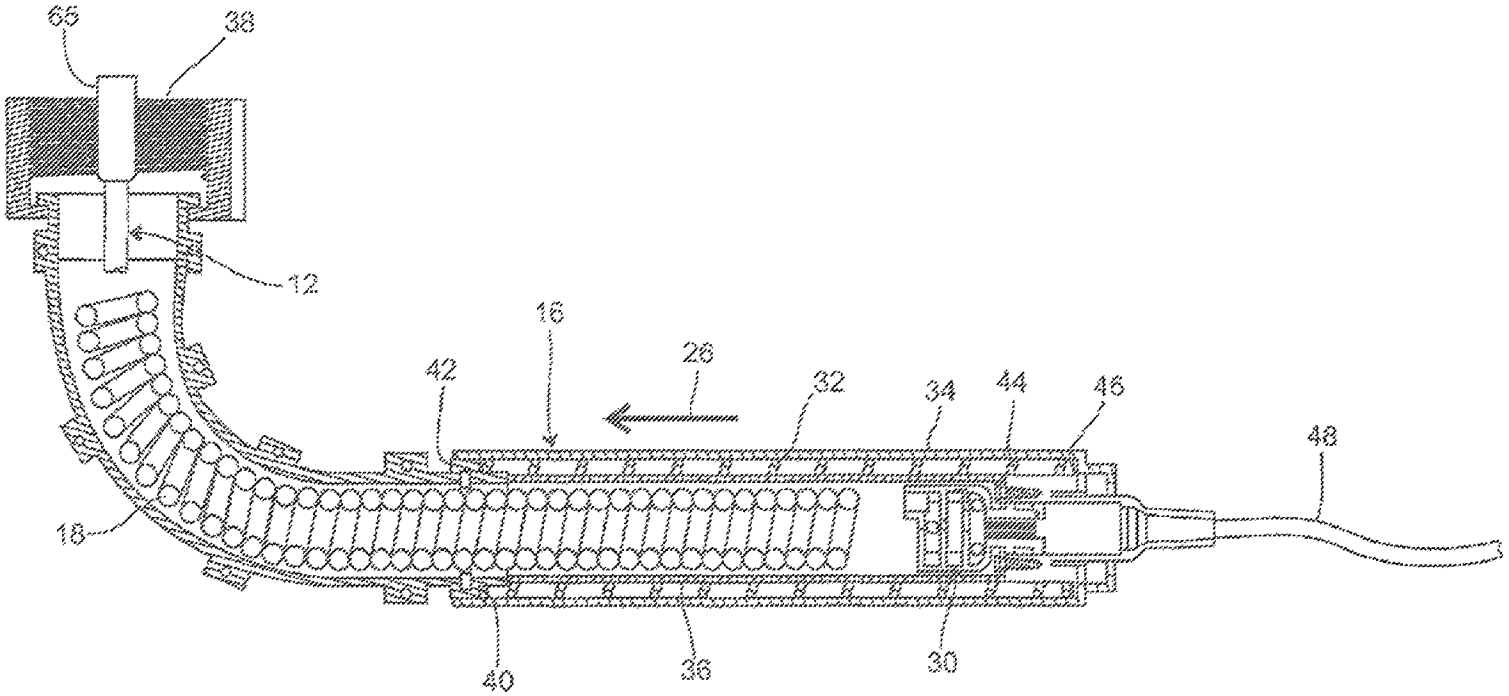
FIG. 5 is a side view of the FIG. 3 illustration.

Referring to FIG. 5, for example, the curly-Q cord 12 has an elastically stretchable length consisting of a plurality of coils 18. When a mounting member portion or mounting "puck" (see item 20 in FIG. 2) is lifted from a base 22, the curly-Q cord 12 is pulled from the coaxial housing, up through an opening in countertop surface 24. When this happens, the curly-Q cord 12 is put into tension in two ways. First, the cord's coils 18 are stretched. This creates an elastic tension that is biased to return the curly-Q cord 12 back into the coaxial housing 16 as the mounting member 20 is returned to the base 22.

Depending on how much the curly-Q cord 12 is stretched (corresponding to how far the mounting member 20 is drawn away from the countertop 24), the tension in the cord 12 causes the shuttle 30 to move in the direction of arrow 26 in FIG. 5, against the bias of a spring 32 (described further below).

Figure 8:
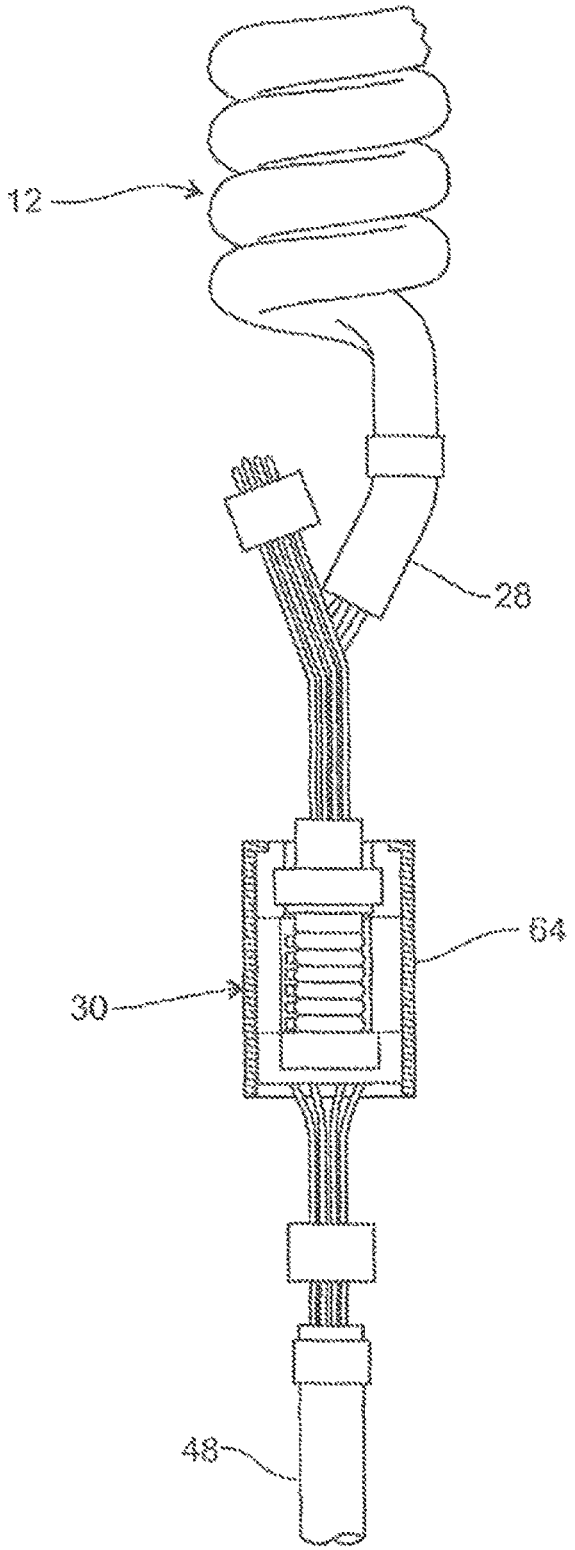
FIG. 8 is another view of the swivel assembly.

The end 28 (see FIG. 3) of the curly-Q cord 12 is connected to a fixed swivel assembly portion of the shuttle 30 (carried as part of the shuttle 30). Another example is illustrated in FIG. 8. The purpose of the swivel assembly portion of the shuttle 30 is further described below. However, the end-connection, between curly-Q cord 12 and shuttle 30, compresses the spring 32 when the curly-Q cord 12 is pulled far enough.

As shown in FIG. 5, the spring 32 is located between two cylindrical parts 34, 36 of the coaxial assembly 16. The shuttle 30 travels along the inside length of the inner cylindrical part 36.

Figure 11:
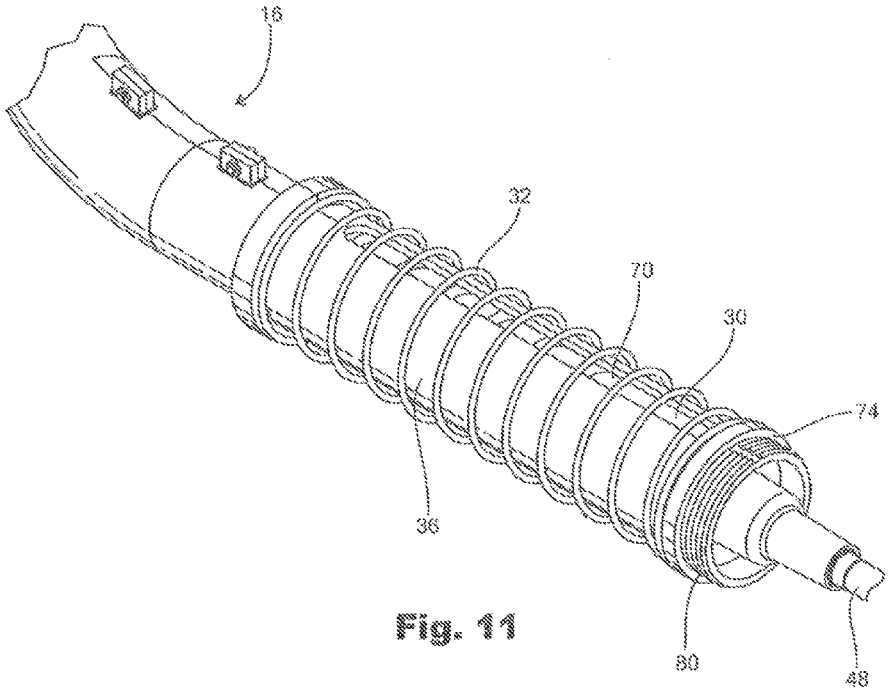
FIG. 11 is a view like FIG. 3, but shows the inner tubular part of a housing with the outer tubular part removed.
Figure 12:
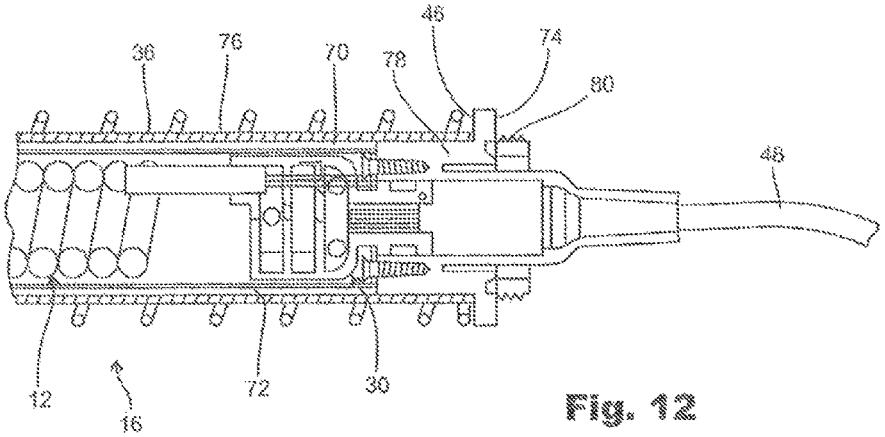
FIG. 12 is a view like FIG. 11, except it is a sectional view taken from the side of the housing.

Referring now to FIG. 11, the shuttle 30 is guided by upper and lower slots 70, 72 in the inner cylindrical part 36 (see, also, FIG. 12). The shuttle 30 has an outer, annular shoulder 74 that surrounds and slides over the outer surface 76 of part 36. The annular shoulder 74 is connected to the shuttle 30, inside part 36, by a connecting section 78 (see FIG. 12).

Figure 13:
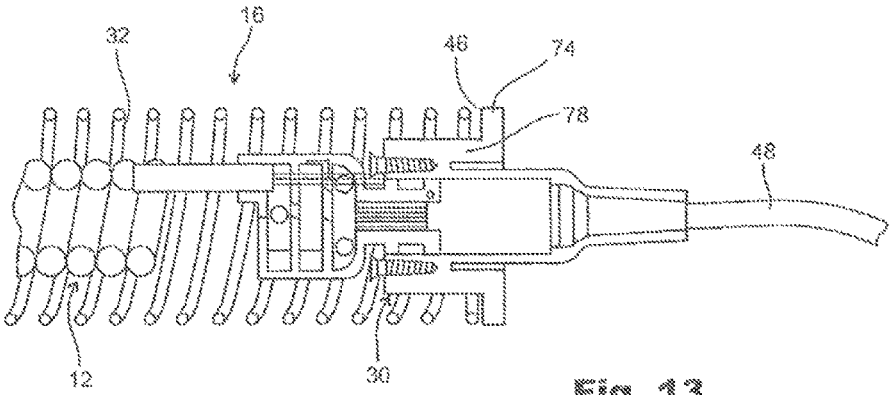
FIG. 13 is a view like FIG. 12, but with the inner tubular part removed from the other parts.

When the shuttle 30 moves in the direction indicated by arrow 26 in FIG. 5, the coils of the spring 32 compress, as shown in FIG. 13. The outer tubular part 34 of the housing is threaded onto the inner tubular part 36 by threads 80 (see FIGS. 12 and 13).

Figure 6:
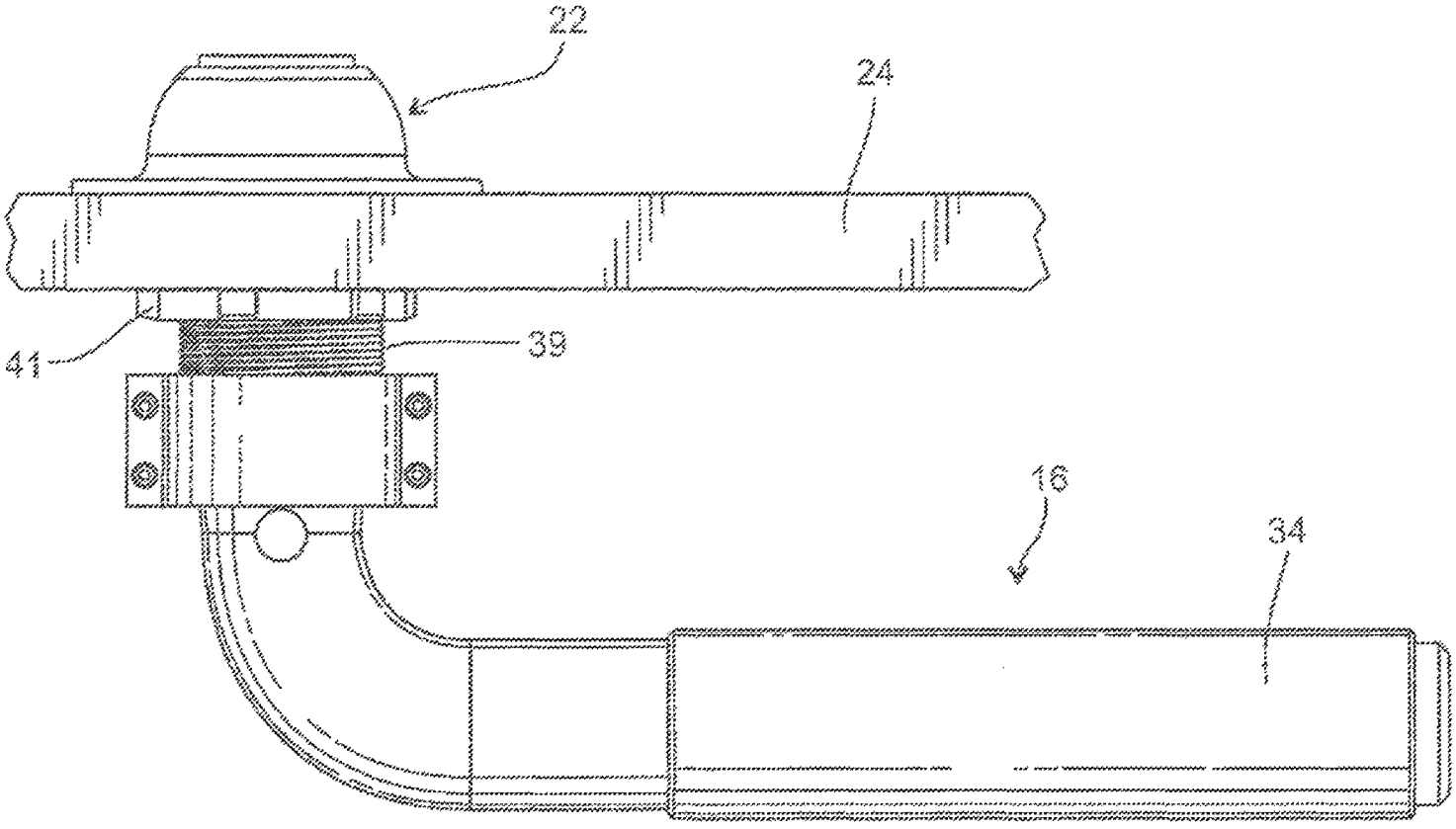
FIG. 6 is similar to FIG. 5, but pictorially illustrates the lower part of the complete design illustrated in FIG. 1.

The coaxial assembly 16 is not designed to turn. In one embodiment, shown in FIGS. 3-5, the assembly 16 is mounted to the underside of the countertop 24 by threads 38. Referring to FIG. 6, threads 38 are tightened onto a similar threaded coupling 39 that is held in place, against rotation, by a nut 41.

FIG. 1 illustrates an alternative mounting system where the threads 38 on housing 16 are replaced with a lip 43. The lip 43 is clamped between two brackets 45, 47 that are tightened together by a wing nut 49.

The brackets 45, 47 are connected to a mounting plate 51 by machine screws 53, 55. FIG. 1 illustrates a different style, but nevertheless equivalent mounting base 22 that is connected to the countertop 24 by an arrangement of plates 57, 59 and mounting screws 61, 63. The end of the curly-Q cord 65 (see, e.g., FIG. 4) passes up from the coaxial assembly 16 through the opening 67 in the mounting base 22.

The assembly 16 holds and contains the curly-Q cord 12 when the "puck" 20 is at rest on base 22. In this respect, the envelope defined by the hollow housing 16 serves to contain and hold the coils 18 of the curly-Q cord 12 (as shown in FIG. 5).

One end of the coaxial assembly's spring 32 (see numeral 40 in FIG. 5) abuts against a shoulder 42 on the inner cylindrical part 36 of housing 16. The other end of the spring 32 abuts against the inner surface 46 of the shuttle's annular shoulder 74, which encircles and rides along the outer surface of inner tubular part 36.

The outer cylindrical part 34 covers the spring 32 and prevents it from being interfered with by outside cabling, etc., as well as providing a cap or stop for shuttle 30 so that it doesn't exit the assembly 16. This arrangement enables the shuttle part 30 to retract against the bias of spring 32 as the first cable assembly or curly-Q cord 12 is pulled. As mentioned above, the spring 32 assists the return of the first cable assembly back into coaxial assembly 16 as the mounting member 20 returns to its original position.

As was summarized above, the elasticity created by the coils 18 in curly-Q cord 12, in combination with the spring-loaded retraction feature of the coaxial housing assembly 16, creates two independent sources of elastic return for the system 10. The spring 32 in the housing 16 provides a tension "assist" or augmentation function to ensure that the curly-Q cord 12 is fully retracted, taking into account that the cord coils 18 may not fully retract for different reasons.

Figure 3:
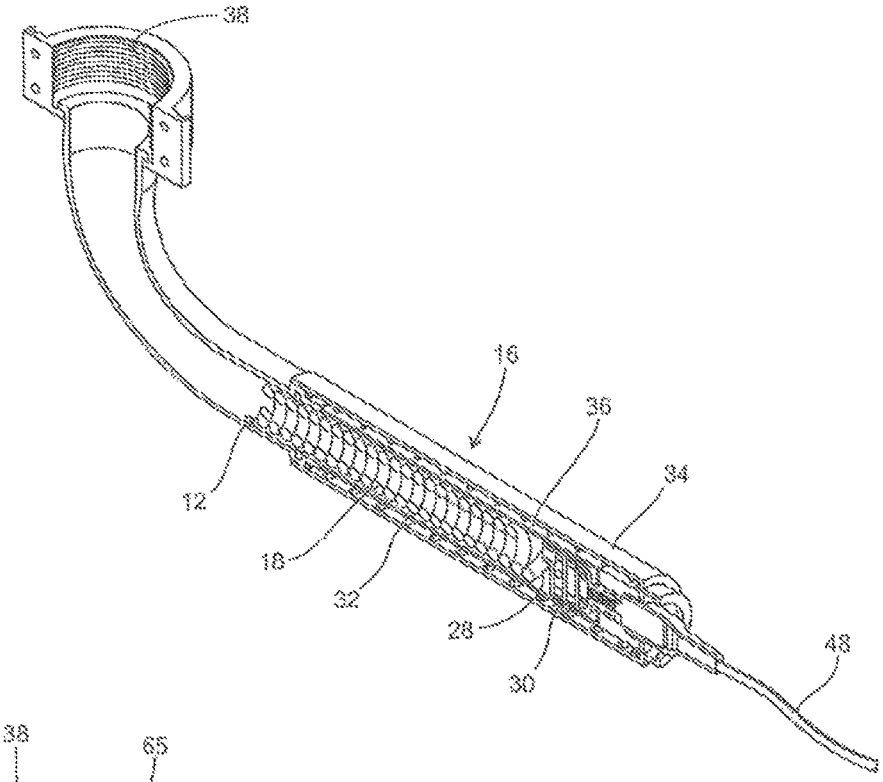
FIG. 3 is a sectional, pictorial view of the lower part of the design illustrated in FIG. 1.
Figure 4:
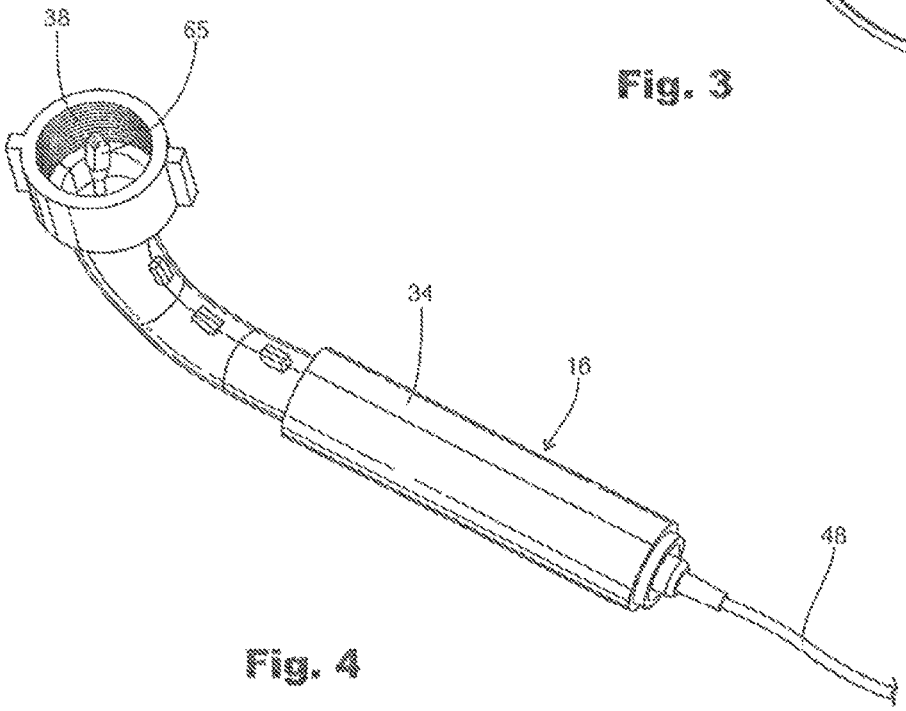
FIG. 4 is a view like FIG. 3, but is not sectioned.

Referring now to FIG. 3, the shuttle 30 will now be further described. The shuttle 30 includes an in-line connector assembly that electrically couples the first cable assembly 12 to an upstream power/signal supply cable 48. The shuttle 30 enables power or other kinds of electrical signals to be transmitted from cable 48 into the first cable assembly 12.

Figure 7:
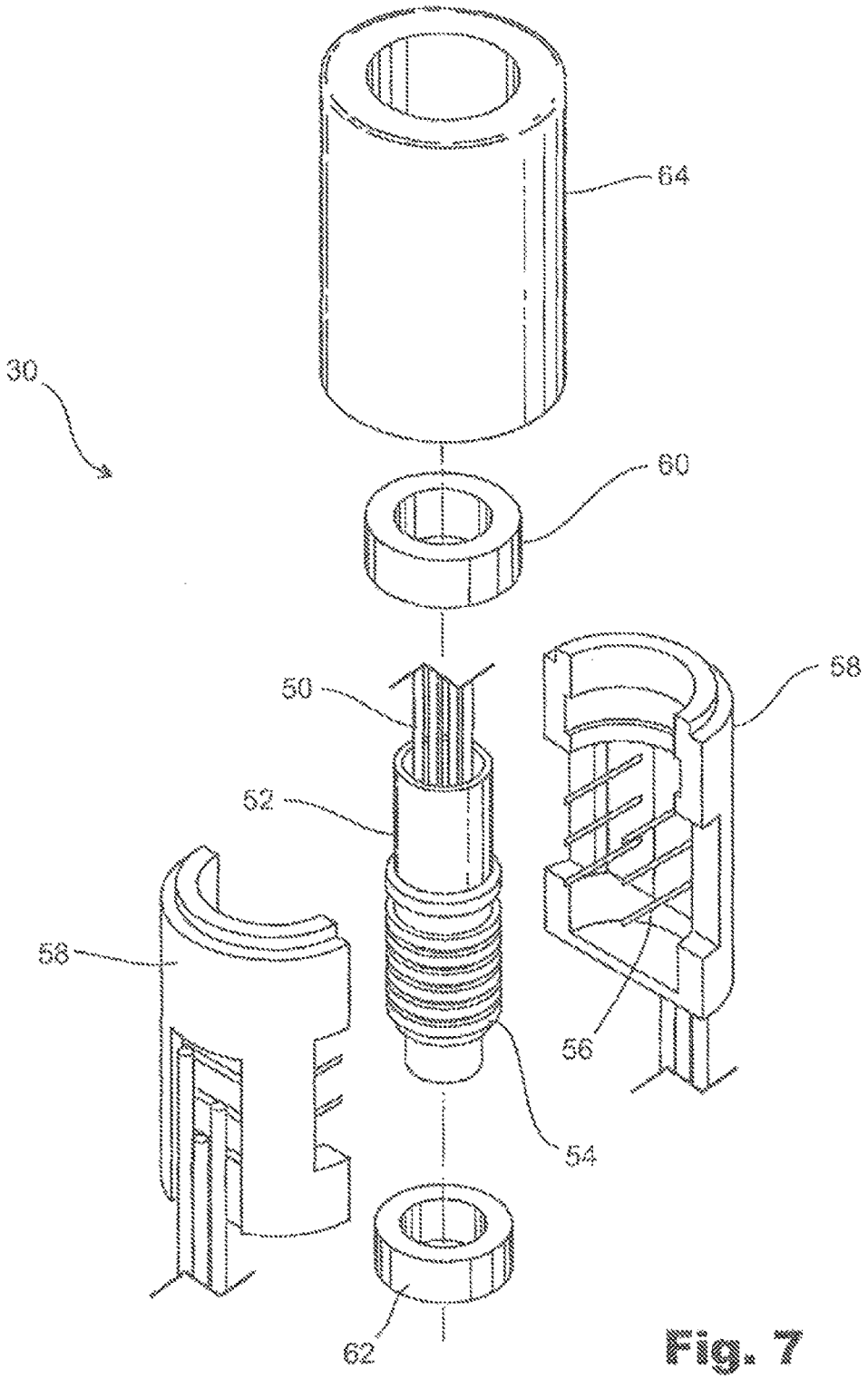
FIG. 7 is an exploded view of a swivel assembly that is incorporated in the design illustrated in FIG. 1.

FIG. 8 illustrates one example of a suitable shuttle part 30 that integrates a swivel. FIG. 7 illustrates the individual component parts that are common to this type of connector. For example, the first cable assembly 12 may consist of a multiple number of sheathed wires (see item 50, for example). Each wire extends into a cylindrical inner housing 52 and terminates in a ring contact 54. The ring contact 54 is in sliding contact with a similar commutator-type contact 56 in an outer cylinder 58 (shown in halves). The inner cylinder 52 rotates within the outer cylinder 58 via two bearings 60, 62. The entire assembly of parts is contained within an outer cylindrical housing 64. This type of swivel connector construction is conventional and would be known to a person skilled in the art. There are many kinds of in-line swivels available that would accomplish the same function.

For optimum performance it is desirable to include a swivel within the length of the first cable assembly or attached to either end of the first cable assembly. In one example, a swivel is integrated into shuttle 30 included in the coaxial assembly 16, as just described. The swivel in the shuttle 30 allows the first cable assembly 12 to be pulled and retracted with minimum torsional forces placed on the curly-Q cord 12 as the mounting member 20 is pulled and returned by a consumer. In addition, and referring now to FIG. 9, the outer end 65 of the curly-Q cord 12 (see FIG. 4) may connect to a similar swivel connector 66 in the mounting member 20.

Figure 9:
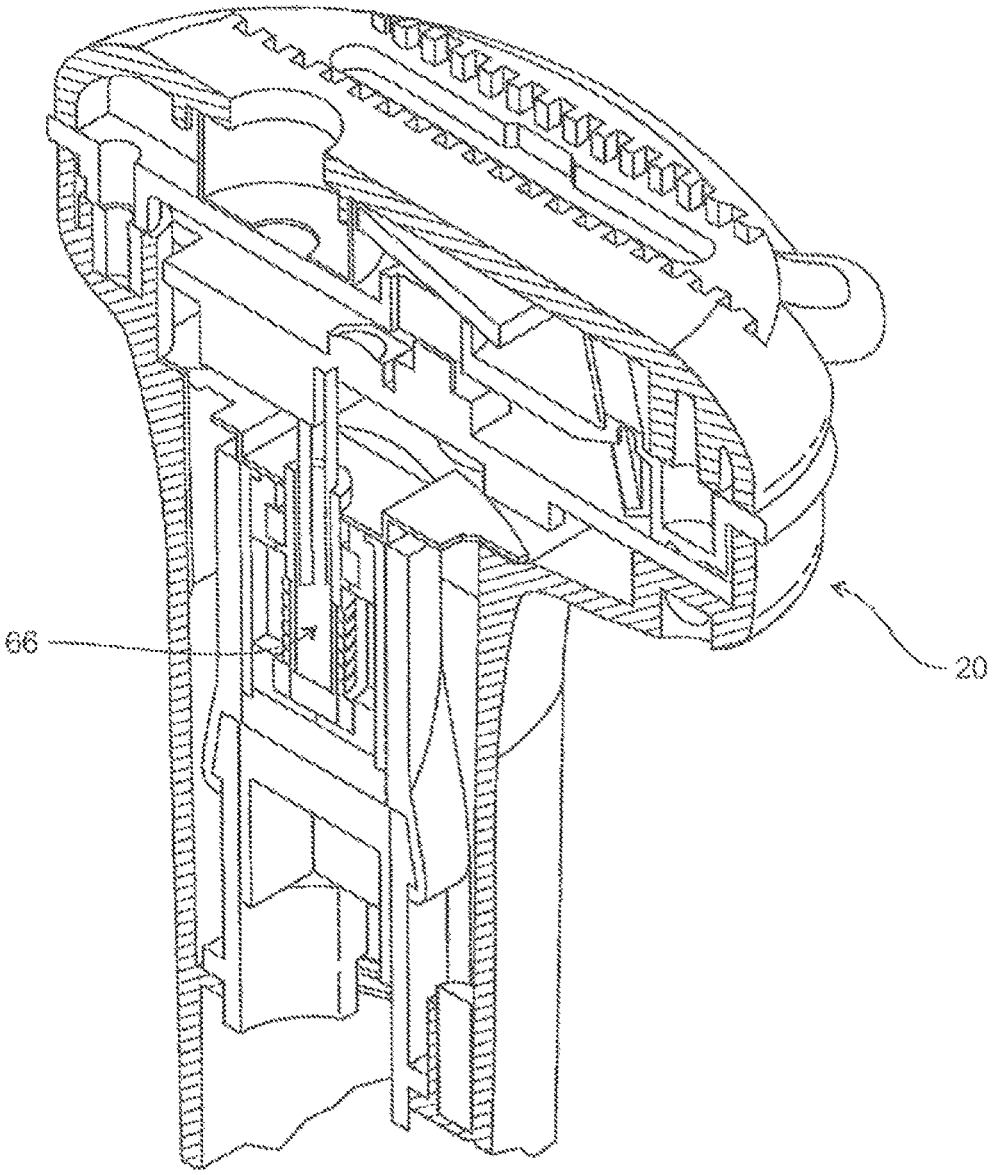
FIG. 9 is a sectional view of the upper part of the design (or mounting member) shown in FIGS. 1 and 2, illustrating a slightly different physical configuration with a swivel.

FIG. 9 illustrates a mounting member 20 having a slightly different footprint. As a skilled person would understand, the size and shape of a mounting member 20 will vary, depending on the retailer's needs. However, if used, the position of the swivel assembly in the second mounting member is apparent from the illustration. The functional operation of swivel assembly 66 is identical to swivel assembly 30 in FIG. 8, as previously described.

While it is not illustrated, it is conceivable that an in-line swivel configuration in shuttle 30 (in the aft end of housing 16) is sufficient to address cord twisting and distortion problems without the "assist" function of spring 32. In other words, the combination of a swivel at 30, the natural retraction force of the cord's coils 18, and the containment function of the housing may be sufficient to fully retract the cord 12 into the housing 16. Further testing will be required in order to establish whether the spring 32 can be eliminated in this way.

Once again, the second cable assembly 14 is electrically coupled to the first cable assembly 12 via the mounting member 20, although alternative means of connection may be used. The second cable assembly 14 also electrically couples the mounting member to an electronic device 68. This type of arrangement is common and has long been used in the industry for years.

The foregoing description is not intended to limit the scope of the patent right. It is to be understood that the design described here may be altered in a number of different ways without departing from the spirit and scope of what is considered to be the invention. Therefore, the invention is to be limited only by the patent claims that follow, the interpretation of which is to be made in accordance with the standard conventions for patent claim interpretation.

What is claimed is:

[1. A cable management system for use in displaying one of a plurality of electronic devices in a commercial setting, comprising:

a cable assembly that provides an electrical coupling to a displayed electronic device, the cable assembly being extendable and retractable;

a mounting member for carrying the displayed electronic device, and wherein the cable assembly at least partially extends into and is electrically coupled to the mounting member, and further, the cable assembly is connected to the mounting member in a manner so as to facilitate extension and retraction movements of the cable assembly and mounting member for respectively lifting and replacing the mounting member to and from a retail display while the mounting member is coupled to the cable assembly; and a swivel assembly that is in-line in the cable assembly for enabling at least a portion of the cable assembly to rotate while maintaining the electrical coupling to the displayed electronic device during extension and retraction movements of the cable assembly, in a manner so as to reduce torsional forces placed on the cable assembly during said extension and retraction movements.]

[2. The cable management system of claim 1, wherein the swivel assembly couples an end of the extendable and retractable cable assembly to the mounting member.]

[3. The cable management system of claim 1, wherein the extendable and retractable cable assembly has a first end connected to the mounting member and a second end connected to an upstream power supply, and wherein the swivel assembly couples the second end of the cable assembly to the upstream power supply.]

[4. A cable management system for use in displaying one of a plurality of electronic devices in a commercial setting, comprising:

a cable assembly that is extendable and retractable relative to a display surface, the cable assembly providing an electrical coupling to a displayed electronic device, with the cable assembly having a modular connector;

a mounting member head for carrying the displayed electronic device, the mounting member head having an internal portion shaped to receive a swivel assembly; and a swivel assembly received within the mounting member head for electrically coupling the cable assembly to the mounting member head and the displayed electronic device via the modular connector, and when so connected, the swivel assembly being in-line relative to the cable assembly for enabling the mounting member head to rotate relative to the cable assembly while maintaining the electrical coupling to the displayed electronic device during extension and retraction movements of the cable assembly, in a manner so as to reduce torsional forces placed on the cable assembly during the extension and retraction movements.]

[5. The cable management system of claim 4, wherein the extendable and retractable cable assembly has a first end connected to the mounting member head and a second end connected to an upstream power supply.]

[6. The cable management system of claim 4, including a second cable assembly for electrically coupling the displayed electronic device to the extendible and retractable cable assembly.]

*7. A cable management system for use in displaying one of a plurality of electronic devices in a commercial setting, comprising:*

*a cable assembly that provides an electrical coupling to a displayed electronic device, the cable assembly comprising an elastically extendable and retractable cable;*

*a swivel assembly;*

*a mounting member for carrying the displayed electronic device, the mounting member having an internal portion sized and shaped to receive the swivel assembly, and wherein said cable assembly is electrically coupled to the mounting member, wherein said mounting member is supported by a base surface having an opening, and further, the cable assembly extends through said opening and is connected to the mounting member in a manner so as to facilitate extension and retraction movements of the cable assembly and mounting member for respectively lifting and replacing the mounting member to and from a retail display while the mounting member is connected to the cable assembly; and*

*a dual return tension assembly;*

*wherein the swivel assembly is in-line in the cable assembly and is enclosed within and retained by said internal portion for enabling at least a portion of the cable assembly to rotate while maintaining the electrical coupling to the displayed electronic device during extension and retraction movements of the cable assembly, in a manner so as to reduce torsional forces placed on the cable assembly during said extension and retraction movements; and*

*wherein the dual return tension assembly is biased to retract said mounting member, wherein the dual return tension assembly comprises a shuttle connected to the cable assembly, wherein the shuttle is slidable to compress a spring in a manner that compresses the spring to create a spring tension in response to an extension movement of the mounting member to a lift position for the mounting member, wherein the spring tension and an elastic tension provided by the cable assembly are biased to retract the mounting member away from the lift position.*

*8. The cable management system of claim 7, wherein said cable assembly includes a curly-Q cord.*

*9. The cable management system of claim 8, wherein the extendable and retractable cable assembly has a first end connected to the mounting member and a second end connected to an upstream power supply.*

*10. The cable management system of claim 9, including a second cable assembly for electrically coupling the displayed electronic device to the extendable and retractable cable assembly.*

*11. The cable management system of claim 7, further comprising:*

*a housing assembly within which the dual return tension assembly, the spring, and a portion of the cable assembly are housed;*

*wherein the shuttle is slidably engaged within the housing assembly such that the shuttle slides along a path within the housing assembly in a manner that compresses the spring to create the spring tension in response to the extension movement of the mounting member.*

*12. The cable management system of claim 11, wherein the cable assembly, the spring, the shuttle, and the sliding path for the shuttle are co-axially disposed within the housing assembly.*

*13. The cable management system of claim 7, further comprising:*

*another swivel assembly, wherein the another swivel assembly is positioned inside the shuttle and adapted to permit rotation of the cable assembly relative to the shuttle.*

*14. The cable management system of claim 7, wherein the spring tension and the elastic tension are independent of each other.*

*15. A cable management system for use in displaying one of a plurality of electronic devices in a commercial setting, comprising:*

*a cable assembly that provides an electrical coupling to a displayed electronic device, the cable assembly comprising an elastically extendable and retractable cable;*

*a mounting member for carrying the displayed electronic device, wherein said cable assembly is electrically coupled to the mounting member, wherein said mounting member is supported by a base surface having an opening, and further, the cable assembly extends through said opening and is connected to the mounting member in a manner so as to facilitate extension and retraction movements of the cable assembly and mounting member for respectively lifting and replacing the mounting member to and from a retail display while the mounting member is connected to the cable assembly;*

*a swivel assembly that is in-line in the cable assembly and is enclosed within and retained by said mounting member for enabling at least a portion of the cable assembly to rotate while maintaining the electrical coupling to the displayed electronic device during extension and retraction movements of the cable assembly, in a manner so as to reduce torsional forces placed on the cable assembly during said extension and retraction movements; and*

*a dual return tension assembly that is biased to retract said mounting member, wherein the dual return tension assembly comprises a shuttle connected to the cable assembly, wherein the shuttle is slidable to compress a spring in a manner that compresses the spring to create a spring tension in response to an extension movement of the mounting member to a lift position for the mounting member, wherein the spring tension and an elastic tension provided by the cable assembly are biased to retract the mounting member away from the lift position.*

*16. The cable management system of claim 15, wherein said cable assembly includes a curly-Q cord.*

*17. The cable management system of claim 16, wherein the extendable and retractable cable assembly has a first end connected to the mounting member and a second end connected to an upstream power supply.*

*18. The cable management system of claim 17, including a second cable assembly for electrically coupling the displayed electronic device to the extendable and retractable cable assembly.*

*19. The cable management system of claim 15, further comprising:*

*a housing assembly within which the dual return tension assembly, the spring, and a portion of the cable assembly are housed;*

*wherein the shuttle is slidably engaged within the housing assembly such that the shuttle slides along a path within the housing assembly in a manner that compresses the spring to create the spring tension in response to the extension movement of the mounting member.*

*20. The cable management system of claim 19, wherein the cable assembly, the spring, the shuttle, and the sliding path for the shuttle are co-axially disposed within the housing assembly.*

*21. The cable management system of claim 15, further comprising:*

*another swivel assembly, wherein the another swivel assembly is positioned inside the shuttle and adapted to permit rotation of the cable assembly relative to the shuttle.*

*22. The cable management system of claim 15, wherein the spring tension and the elastic tension are independent of each other.*

* * * * *